United States Patent [19]

Eckmann

[11] Patent Number: 4,986,632

[45] Date of Patent: Jan. 22, 1991

[54] APPARATUS FOR ASSISTING VIEWING OF STEREOSCOPIC DISPLAYS

[76] Inventor: Rolfe W. Eckmann, 630 5th Ave. S. #204, Edmonds, Wash. 98020

[21] Appl. No.: 407,477

[22] Filed: Sep. 14, 1989

Related U.S. Application Data

[63] Continuation-in-part of Ser. No. 196,442, May 20, 1988, Pat. No. 4,925,270.

[51] Int. Cl.$^5$ .................. G02B 27/22; G02B 27/02; G02B 7/18
[52] U.S. Cl. .................................... 350/131; 350/133; 350/143
[58] Field of Search ............... 350/130, 131, 133, 146, 350/138, 139, 142, 143, 145, 286

[56] References Cited

U.S. PATENT DOCUMENTS 4,730,898 3/1988 Curtin .................. 350/133

FOREIGN PATENT DOCUMENTS 339092 10/1903 France .................. 350/133
1039091 10/1953 France .................. 350/133
290355 8/1953 Switzerland .................. 350/133
1382498 2/1975 United Kingdom .................. 350/133

Primary Examiner—Jon W. Henry
Attorney, Agent, or Firm—Russell W. Illich

[57] ABSTRACT

A stereoscopic viewing device to induce the line of sight of a viewer's eyes to converge on a three dimensional image formed from a pair of stereoscopic images. The device includes one or two prisms and blinders to block out ghost images which form to the sides of the superimposed image. The device further includes adjustment means to narrow or widen the viewing window within the prism(s). Various embodiments of the adjustment means includes blinders that are slidable panels within a guide track, slidable prisms within a guide track, or opaque tape which is cut to size and adhered to the surface of a prism. The stereoscopic device with a single prism also includes a unique process of forming the three dimensional image which includes viewing the superimposed images through a pair of open windows refracting the view of one of the eyes through use of a transparent prism, and screening the other eye to focus on the central three dimensional image.

5 Claims, 7 Drawing Sheets

APPARATUS FOR ASSISTING VIEWING OF STEREOSCOPIC DISPLAYS

CROSS REFERENCES TO RELATED APPLICATIONS

This application is a continuation-in-part of the patent application, Ser. No. 07/196,442 filed 05/20/88 now U.S. Pat. No. 4,925,270 and directed to an apparatus for assisting viewing of stereoscopic displays.

BACKGROUND OF THE INVENTION

Free-viewing of stereoscopic displays such as photographs is an enjoyable experience. A person with satisfactory vision from both eyes stands several feet away from two stereoscopic images such as photographs, a left and right. The person, trained in free-viewing sets his/her left eye to focus onto the right photograph (which is indeed the left image) while setting their right eye to focus onto the left photograph (which is actually the right image). When properly done, the person sees three images. The middle image appearing to have depth, or a third dimension. Stereoscopic photographs are photographs taken of the same image with small spatial and angular displacement alike images seen from a left eye and a right eye.

For free-viewing to happen muscles of the eyes have been trained to shift the line of sight from the object of their vision, the left eye to cross over the center towards the right and the right eye to cross over the center towards the left. Free-viewing superimposes the right image from the left eye onto the left image from the right eye and in focus. The mind seeing two photographs identical except for small spatial and angular displacements superimposed upon themselves, interprets the center image as one having the depth of an object with three dimensions. Once the free-viewing of the image has occurred, the mind controlling the muscles of the eyes maintains the three dimensional position of the image.

Free-viewing is a memorable experience albeit difficult to achieve since the eyes must be kept at a convergence greater than that dictated by the normal focus. To attain this convergence the focus must be kept on a point beyond the convergent point. This focus is impossible to achieve for some people and produces discomfort in others. The voluntary muscles are not sufficiently developed to overcome the natural impulse to focus onto separate objects or to operate outside their normal range.

Stereoscopic viewers are old and well known in the prior art of optics. Many of the basic concepts of stereoscopic viewing were derived in the late 1800's and early 1900's. However, this area of optics has been largely ignored in recent times.

New developments in this area have mainly been confined to the projection of stereoscopic images or the actual photography or development of superimposed images using modified stationary and motion cameras. The U.S. Pat. No 3,891,303 to Barquero shows an adaptor to be used with cameras to produce stereoscopic image. Barquero shows a very effective way of producing a central superimposed image by using prisms before the viewing lenses and using screens in front of the prisms to block out secondary image. The U.S. Pat. No. 3,039,358 to Vierling uses Barquero's concept and incorporates the prisms and screens integrally within a camera.

The re-emergence of 3-dimensional projection has been given much attention in recent years and has not been confined to still photography. The development of this technology for motion pictures, television, and computer images has been growing at a rapid pace. However, stereoscopic viewers have remained largely undeveloped and no significant improvements have been made in viewing devices in many years.

The device disclosed in the U.S. Pat. No. 262,846 to Stevens was a standard type of stereoscopic viewing device used well into the 1900's. This device has some severe limitations. The device requires a specific size photograph, three or four major adjustments were needed to view the 3-dimensional image, and two sets of image blocking screens were needed to block undesired images. The U.S. Pat. No. 3,502,390 to Gilmore shows a much simpler device to view 3-dimensional images of x-rays. However, outer walls and a central partition are needed to force the eyes to see the superimposed image. These walls force the pictures or x-rays to be placed at a predetermined distance and remain a standard size.

One viewing device that went a long way to correcting the deficiencies of the above noted devices is the device disclosed in the U.S. Pat. No. 1,440,457 to Girsdansky. This device divorces the viewing lenses from the viewing screen(s). This was a significant breakthrough in 3-D viewing. By arranging the prisms in a manner similar to the projectors of Barquero and Vierling, Girsdansky's viewing device enables a viewer to induce free-viewing and see superimposed images of any size and at great distances for applications in auditoriums, museums, and theaters.

But Girsdansky's device has several disadvantages which have remained unimproved on for more than sixty years. First, the blocking screens require both a longitudinal and a lateral adjustment for the viewer to focus properly on the superimposed image. Second, the blocking screens move laterally together and apart at concurrent distances. This does not allow for complete focusing adjustment for all types of persons who may need one blocking screen moved further in than the opposite blocking screen. Third, the openings within the viewer limit the width of the pictures being viewed; thus, to view wide motion picture screens on would have to sit well back in the theater to see the entire screen. Finally, the holder of Girsdansky's device is generally bulky and would be expensive to manufacture requiring many different parts.

SUMMARY OF THE INVENTION

With the advancements being made in the graphics of stereo images in all their applications, there is a pressing need in the art to develop a stereoscopic viewing device that allows a viewer the maximum in flexibility in viewing a variety of stereo images in a variety of environments with the greatest efficiency.

The present invention solves the problems inherent in the prior art viewing devices, and does allow for a wide variety of viewing situations through a very efficient, yet simple viewing mechanism. The present invention uses one or two prisms with a pair of blinders or blocking screens to block out undesired ghost images that appear on either side of the three dimensional image.

One object of the present invention is to provide a stereoscopic viewing device that allows a viewer the freedom to see peripherally and not restrict the viewer's sight down a tunnel-type viewing device.

Another object of the present invention is to provide a stereoscopic viewing device that allows independent focusing of the eyes to accommodate all types of people with different ocular dimensions.

Another object of the present invention is to provide a stereoscopic viewing device that allows a viewer to see the superimposed image with a single focusing motion.

Another object of the present invention is to provide a stereoscopic viewing device that may be used on all focusing planes.

Yet another object of the present invention is to provide a stereoscopic viewing device that is light, compact and inexpensive to manufacture.

Still further objectives of the invention will become apparent upon a full reading of the detailed description of the invention, as follows.

DETAILED DESCRIPTION OF THE INVENTION

Figure 1:
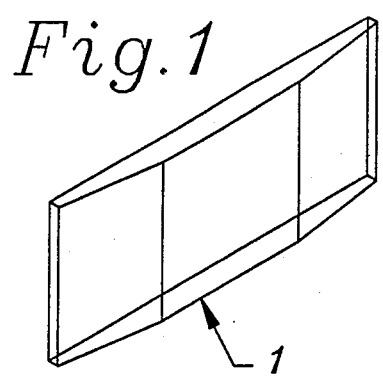
FIG. 1 shows a perspective view of the prisms used in the stereoscopic viewing device.
Figure 2:
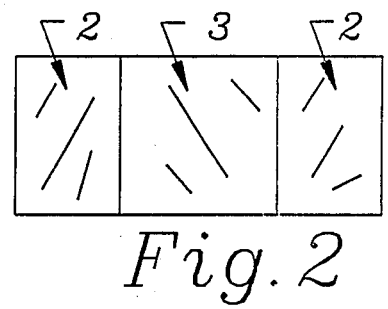
FIG. 2 shows a front plan view of the prisms of FIG. 1.
Figure 3:
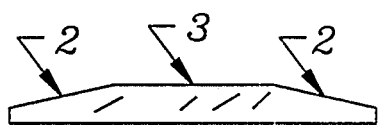
FIG. 3 shows a top view of the prisms of FIG. 1.

The main aspect of the present invention involves using prisms to permit the eyes to remain in their normal line of sight for a given focal point be it close up or distant. FIGS. 1-3 show one type of arrangement for these type of prisms. In this case a left and a right prism are formed into one integral unit 1. Left and right prisms are formed by the sloping faces 2 while center face 3 is used to interconnect the two prisms. It should be noted that the center face is not used in the viewing process other than to hold the prisms together and therefore could be clear, opaque, or made of an entirely different material. The prisms can be made of glass or any transparent plastic.

Figure 4:
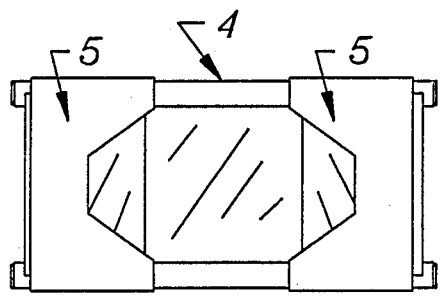
FIG. 4 shows a front plan view of a first embodiment of the invention.
Figure 5:
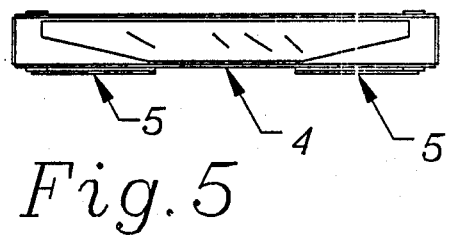
FIG. 5 shows a top view of the viewing device of FIG. 4.

FIGS. 4 and 5 show a first embodiment of the viewing device which uses the prism arrangement shown in FIGS. 1-3. The device includes a housing 4 for holding the prisms in a single position. Mounted on the housing 4 are a pair of blinders 5. These blinders slide along the top and bottom rails of the housing such that they can be slid toward and away from each other as viewed in FIG. 4. The purpose of the blinders is to cover a portion of the prisms for reasons that will be described later.

A person using the device for stereo viewing can look out of the device from the front or rear planes as viewed in FIG. 4. This is because a prism always reflects a light ray outwardly at the same angle. Hence, it would not matter whether the person using the device has the angled faces 2 of FIG. 3 facing their eyes or away from their eyes as the light rays coming through the prism will always be deflected at the same angle. These angles will be discussed in much more detail, below.

Figure 6:
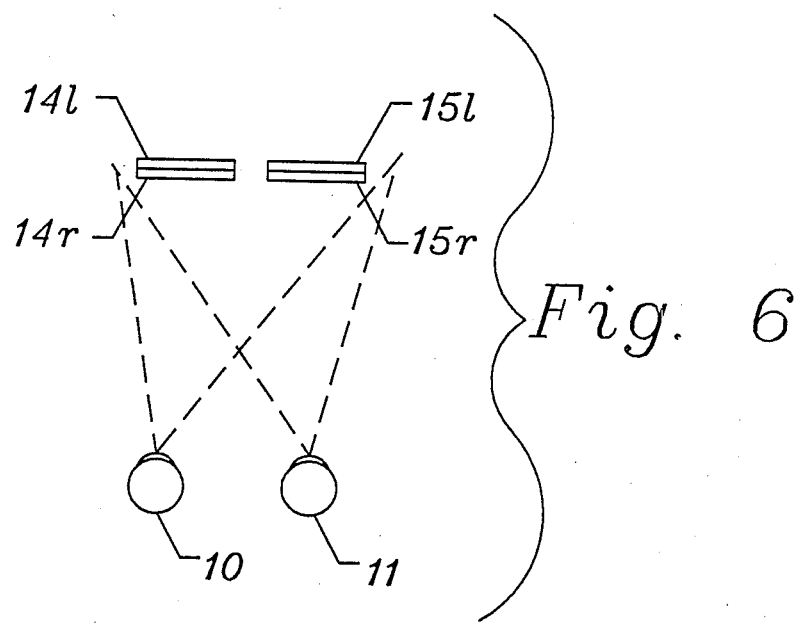
FIGS. 6-8 show a series of top plan views describing the process of stereoscopic viewing with and without a pair of prisms.
Figure 7:
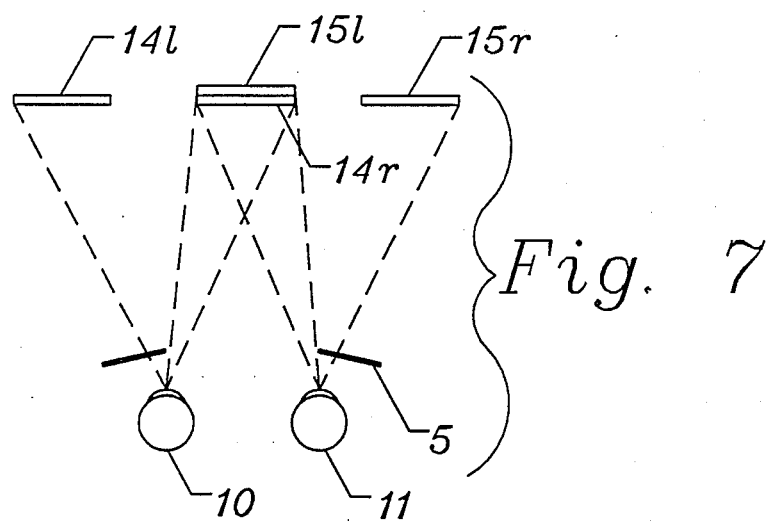
Figure 8:
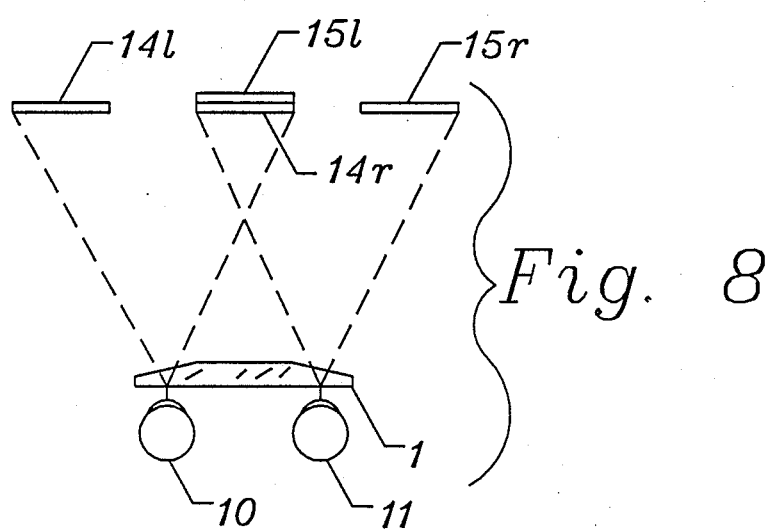

FIGS. 6-8 show the process of free and stereo viewing in which the viewer's eyes must achieve to view two images as a superimposed three dimensional image. FIG. 6 begins by showing a viewer's eyes 10 and 11 looking at a pair of stereo images 14 and 15. In this case the viewer sees the images 14*l* and 15*l* with the right eye and 14*r* and 15*r* with the left eye. Viewing both images with both eyes produces two separate images in two dimensions as shown by the dashed viewing lines.

Free viewing can occur without a prism as shown in FIG. 7. In this case the viewer must force his/her eyes to converge in order to see the superimposed image 16 formed by the two dimensional images 14 and 15. In this case, the left eye sees a central image 14*r* while the left eye sees an offset central image 15*l*. These two images combined form a three dimensional central image. Blinders 5 assist the viewer by blocking out light rays which would otherwise make ghost images 14*l* and 15*r* viewable. Hence, eyes 10 and 11 only see the superimposed three dimensional image 15*l*,14*r*. The drawback of viewing superimposed images in this manner is getting the eye muscles to adjust to such convergence in conflict with the eye's normal focus as dictated by that convergence. Once achieved it is rather difficult to maintain the three dimensional image and this can lead to physical discomfort from eye muscle strain.

FIG. 8 shows the same view as FIG. 6 where the eyes 10 and 11 do achieve stereo viewing with the aid of the prisms 1. In this case, prism deflects the light rays in such a manner to avoid significant strain on the eye muscles. Additionally, achieving the three dimensional viewing initially is much easier with the aid of the prism in deflecting light rays. The drawback to this arrangement however, is that when the superimposed image 15*l*,14*r* comes into view, two additional "ghost" images 14*l* and 15*r* also come into view. This can cause confusion to an inexperienced viewer so that they may refocus onto one of the ghost images and lose the superimposed image. Thus, although the prism helps the viewer initially achieve the stereo viewing experience, the ghost images make it difficult to maintain the experience.

The present invention is a combination of FIGS. 7 and 8 by combining the prisms of FIG. 8 to assist the eyes in achieving the three dimensional image while using the blinders of FIG. 7 positioned closely to the prisms to block out the ghost images. This is a key component of the improvement of this invention over previous three dimensional viewing devices. These devices as described in the background, above, use blocking screens or blinders which are set a significant distance from the prisms. The disadvantage of this is threefold. One, the ghost images actually develop so that adjustment of the screens is critical. Two, the distant screens must be carried by bulky holders which block out any possible peripheral vision and therefore restrict the size of the viewed graphic. And three, since the blinders are at a distance from the prism the person using the device has a harder time achieving stereo viewing since the screens themselves can become an object of focus preventing or delaying the superimposed image from coming into view. The present invention resolves these drawbacks by keeping the screens or blinders close to the prism so that the ghost images never form and the screens are so close that they cannot be a distraction when focusing on the superimposed image. Additionally, by having the screens close to the prism, the entire device can be housed in a housing that is much less bulky and open to a number of different lightweight holders which can be used in a wide variety of applicaitons.

FIGS. 9-15 depict two embodiments of the present invention which employ a single prism and a pair of blinders. By using a single prism the device becomes even more compact and simpler in design and manufacture. The principles behind stereoscopic viewing remain the same within these two embodiments. Namely, the prism assists the viewer's eyes in attaining the necessary convergence to achieve the central three dimensional view while two blinders are used to block out a pair of ghost images on either side of the central image.

Figure 9:
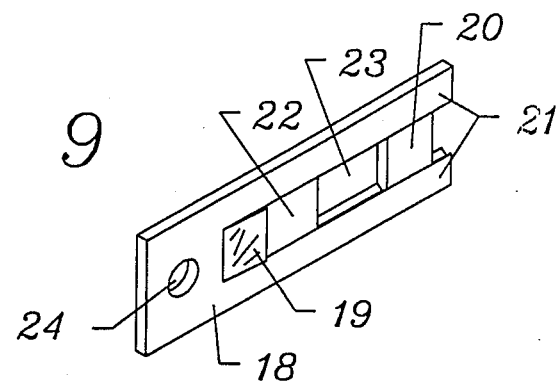
FIG. 9 shows a perspective view of another embodiment of the invention that employs a single prism.

FIG. 9 shows a perspective view of a stereoscopic device that employs a single prism and a movable and adjustable blinder. The device comprises a frame 17 and a single prism 19 rigidly held by the frame. A pair of blinders 18 and 20 are disposed on opposite ends of the frame. Blinder 20 is an adjustable blinder that frictionally slides within a track formed by two arms 21 of the frame. Between the prism 19 and slidable blinder 20 is disposed a divider 22 which is held rigid between the two arms 21. A first window 23 is formed by the two arms 21, divider 22, and blinder 20. The window 23 may be widened or shortened based on a person's interoccular distance by sliding the blinder 20 back or forth within the track formed by arms 21. A preliminary viewing window 24 is disposed on the opposite end of the frame from the slidable blinder 20. Between the preliminary viewing window 24 and prism 19 is blinder 18. Blinder 18 is a static blinder which is actually an integral portion of the frame 17.

Figure 10:
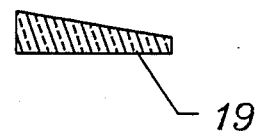
FIG. 10 shows a top plan view of the prism of FIG. 9.

FIG. 10 shows a plan view of the prism 19. The prism is wedge shaped as the prisms of the previous embodiments are to assist the eye in the convergence necessary to achieve a central three dimensional image. In the embodiment of FIG. 9 the prism is less wide than the prisms of the previous embodiments because all adjustment is done by the blinder 20 and the position of one of the eyes always remains directly in front of prism 19 irregardless of interoccular distance. The entire front face of the prism (which is the bottom edge of FIG. 10) comprises the transparent viewing window that an eye looks out of and which converges or diffracts the vision to a central image. The distance between the center point of this viewing window and the second blinder is essentially the interocular distance.

In brief, the viewing process involves adjusting the slidable blinder 20 to a person's unique interoccular distance after which the device may be used on any pair of stereoscopic images. Once the slidable blinder is adjusted, the device is brought up before a person's eyes such that one eye is looking out of the preliminary window 24 while the other eye is looking out window 23. The device is then moved across the person'face such that one eye looks through prism 19 and the other eye comes into line with the edge of window 23 and partially behind blinder 20. As the device is moved the prism 19 assists the eyes in converging to form a central three dimensional image while blinders 18 and 20 block out the undesirable ghost images.

Figure 11:
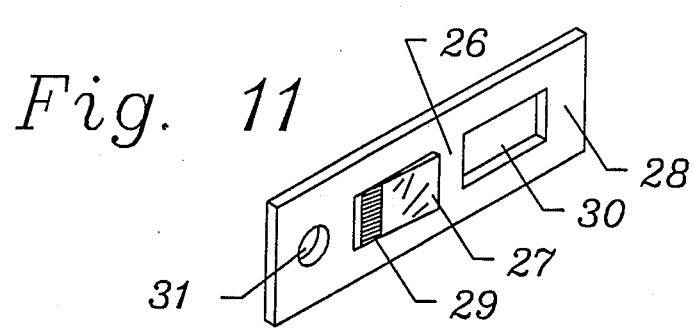
FIG. 11 shows a perspective view of another embodiment of the invention similar to the embodiment of FIG. 9 that also employs a single prism.

FIG. 11 shows a perspective view of a stereoscopic device that employs a single prism and a static adjustable blinder. The device comprises a frame 25 and a single prism 27 rigidly held by the frame. A pair of blinders 28 and 29 are disposed on opposite ends of the frame. Blinder 29 is an adjustable blinder that may be formed as a piece of opaque tape that adheres to a portion of the prism 27. Blinder 28 is disposed on the opposite end of frame 25 from blinder 29. Blinder 28 is a static blinder that is formed as an integral part of frame 25. Between the prism 27 and window 30 is disposed a divider 26 which is also an integral part of frame 25. A first window 30 is formed within frame 25 between divider 26 and blinder 28. A preliminary viewing window 31 is disposed on the opposite end of the frame from the blinder 28.

Figure 12:
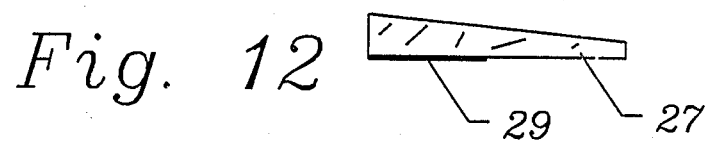
FIG. 12 shows a top plan view of the prism of FIG. 11.

FIG. 12 shows a plan view of the prism 27 used within the embodiment of FIG. 11. The stereoscopic device of this embodiment is adjustable for varying interoccular distances by cutting a piece of tape to the appropriate width and applying its adhesive surface to prism 27 to act as a blinder 29. The opaque nature of the tape prevents the eye from seeing one of the two ghost images. The prism 27 as viewed in FIG. 12 is of wider dimension than the prism of FIGS. 9 and 10. The wider dimension of the prism is necessary to allow for a variety of tape widths to be applied to the surface of prism 27. The front face of the prism 27 (which is the bottom edge of FIG. 12) not obstructed by the opaque tape 29 comprises the transparent viewing window that an eye looks out of and which converges or diffracts the vision to a central image. The distance between the center point of this viewing window and the second blinder is essentially the interocular distance which is adjusted by cutting the tape 29 to an appropriate width to allow the apparatus to be focused properly.

The viewing process through the stereoscopic device of FIG. 11 is substantially similar to the viewing process of the device of FIG. 9. Upon adjusting the device for interoccular distance by applying a piece of tape to the prism 27, the device is brought before a person's eyes so that they look out of windows 30 and 31. As the device is moved across a person's vision, prism 27 and blinder 28 align in front of the person's eyes. The prism 27 assists in the convergence of the eyes necessary to form a central three dimensional image while blinders 28 and 29 block out the undesired ghost images.

Figure 13:
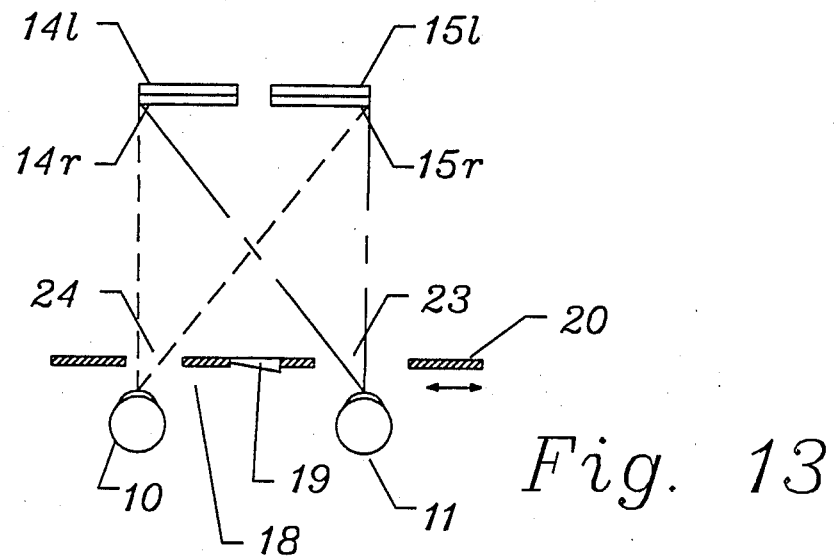
FIGS. 13-15 show a series to top plan views describing the process of stereoscopic viewing with the devices of FIGS. 9 and 11.

The stereoscopic principles behind the use of the single prism devices of FIGS. 9 and 11 is herein described with reference to FIGS. 13-15. FIG. 13 shows a pair of eyes 10 and 11, right and left, respectively, viewing the stereo paired images through unimpaired openings 23 and 24 of the device, respectively. Adjustment action must be taken so that the distance between the center of the prism and the inboard edge of the blinder 20 is at least no less than the person's interocular distance. Fine tuning this adjustment to eliminate the ghost image is best done after 3 dimensional accommodation. During the preliminary viewing of images 14 and 15, the blocking screens 18 and 20 lie to the right of eyes 10 and 11, respectively.

Figure 14:
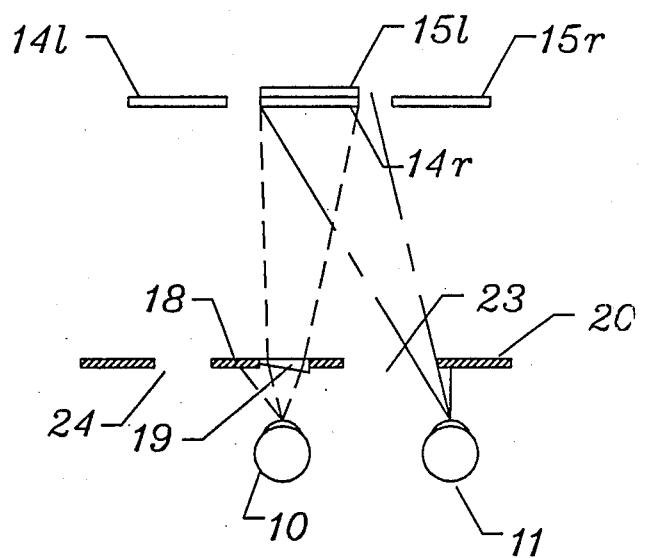

FIG. 14 shows the process of refraction that occurs to the left eye as the device is moved from the preliminary offset position of FIG. 13 to the secondary refracted position of FIG. 14. The device is moved to the left when going from FIG. 13 to FIG. 14. The prism changes the line of sight of the left eye 10, from left to right causing that eye to pick up the right emage 15*l*. This shifting of the line of sight is a natural occurrence due to the prism and the left eye remains in comfortable conformance with the right eye. The right eye 11 meanwhile has not changed its view of the left image that it sees through it's unencumbered window 23. The left image 14*r* as seen by the right eye and right image 15*l* as seen by the refracted left eye are thus superimposed resulting in a central three dimensional image.

The peripheral images or ghost images 14*l* and 15*r* are blocked from sight by adjustment of the blinder 20. Because the proximity of the blinders to the eye and the limiting size of the prism window, blinder 20 when positioned to block out image 15*r*, automatically positions the stationary blinder 18 to block out the left image 14*l*.

Figure 15:
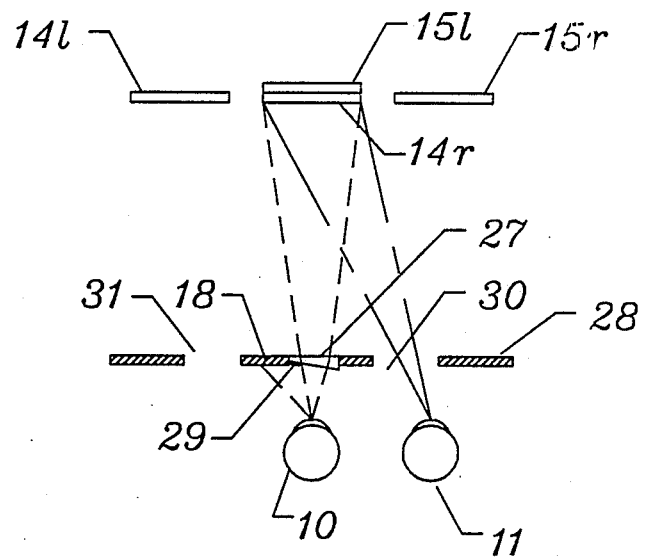

FIG. 15 shows the blocking process that occurs as the device of FIG. 11 is moved in front of the eyes. Due to the offset nature of the viewing, static screen 20 blocks a portion of the right eye's straight-ahead view to block its associated ghost image 15*r*. Meanwhile screen 29 (opaque tape on the prism lens) blocks the left eye's entire straight-ahead view to block its associated ghost image 14*l*. FIG. 15 shows the final position of the device and eyes within three dimensional focus on image 14*r*,15*l*. This image may be maintained sufficiently and comfortably because of the use of prism 27 which shifts the line of sight of the eyes to hold the three dimensional image 14*r*,15*l*.

The stereoscopic viewing principles behind the use of a single prism device with associated blinders is unique from the two prism devices of FIGS. 1–8 and the prior art. This unique viewing process in itself is an improvement over previous stereoscopic viewing methods.

It can be seen by the foregoing description that the present invention discloses a stereoscopic viewing device that is a big improvement over previous viewing devices. There are many different modifications which could be applied to the viewing device that are encompassed by the spirit of the present invention. For example, separate prisms could be mounted rigidly into a housing using movable blinders. The present invention is submitted not to be limited by the foregoing specification, but is defined by the claims appended hereafter.

What is claimed is:

1. An apparatus for assisting viewing of stereoscopic displays comprising:
    a mounting frame comprising a central opening;
    a prism mounted wihtin said frame, said prism including a first face and a second face, said second face lying in a plane that forms an acute angle with said first face, said first and second faces having a transparent viewing window;
    a first blinder positioned in close proximity to said prism, said prism and said first blinder positioned on a first end of said frame;
    a second blinder positioned on a second end of said frame, said central opening positioned in between said first and second ends of said frame;
    adjustment means for varying the distance between the center point of said viewing window and said second blinder;
    wherein, said apparatus may be placed before a pair of eyes and said prism induce a three dimensional central image when viewing superimposed images and wherein said adjustment means in combination with said blinder means allows said apparatus to be adjusted to different ocular dimensions of different persons.

2. An apparatus as claimed in claim 1,
    wherein said viewing window comprises a first edge facing toward said central opening and a second edge facing away from said central opening, said second blinder comprises a first edge facing toward said central opening and a second edge facing away from said central opening, said adjustment means varies the distance between said first edge of said prism and said first edge of said second blinder and said second edge of said prism.

3. An apparatus as claimed in claim 1, further comprising:
    a divider within said frame, said divider positioned in between said prism and said central opening, said divider made of an opaque material.

4. An apparatus as claimed in claim 1, further comprising:
    a preliminary viewing window within said frame, said preliminary viewing window positioned on said first end of said frame, said first blinder positioned in between said preliminary viewing window and said prism.

5. A method of forming a three dimensional image from viewing two superimposed images through a stereoscopic device comprising the following steps:
    sterographic viewing of said superimposed images through a pair of open windows within said device such that one eye is closer to the center point between the pair of images than an opposite eye;
    aligning a pair of blocking screens of said device adjacent said open windows;
    refracting the vision of said one eye from its straight ahead focus to a central three dimensional image through movement of the device across the eyes such that a prism of said device assists in said refraction;
    screening said eyes by further movement of said device across the eyes such that one of said blocking screens blocks a portion of said one eye and said other blocking screen blocks the entire straight-ahead view of said opposite eye;
    wherein, said refraction causes said one eye to converge onto a central three dimensional image diffraction causes said opposite eye to converge onto the central three dimensional image, and said screening blocks a pair of peripheral ghost images that arise from said central image.

* * * * *